United States Patent
Segall

(10) Patent No.: US 8,840,403 B2
(45) Date of Patent: Sep. 23, 2014

(54) WEARABLE PARTIAL TASK SURGICAL SIMULATOR

(76) Inventor: Stuart C. Segall, La Jolla, CA (US)

( * ) Notice: Subject to any disclaimer, the term of this patent is extended or adjusted under 35 U.S.C. 154(b) by 783 days.

(21) Appl. No.: 12/803,609

(22) Filed: Jun. 30, 2010

(65) Prior Publication Data

US 2012/0003621 A1    Jan. 5, 2012

(51) Int. Cl.
  G09B 23/28    (2006.01)
  G09B 23/30    (2006.01)

(52) U.S. Cl.
  CPC ............... *G09B 23/28* (2013.01); *G09B 23/30* (2013.01)
  USPC ........................................................ 434/272

(58) Field of Classification Search
  CPC ...................................... G09B 23/28
  USPC ........................................................ 434/272
  See application file for complete search history.

(56) References Cited

U.S. PATENT DOCUMENTS

| | | | | |
|---|---|---|---|---|
| 4,221,975 A | * | 9/1980 | Ledniczki et al. | 307/116 |
| 4,531,919 A | | 7/1985 | Ware | |
| 5,104,328 A | * | 4/1992 | Lounsbury | 434/273 |
| 5,305,181 A | * | 4/1994 | Schultz | 361/679.03 |
| 5,990,625 A | * | 11/1999 | Meissner et al. | 315/85 |
| 5,995,077 A | * | 11/1999 | Wilcox et al. | 715/841 |
| 6,057,540 A | * | 5/2000 | Gordon et al. | 250/221 |
| 6,984,208 B2 | * | 1/2006 | Zheng | 600/438 |
| 7,810,504 B2 | * | 10/2010 | Guzman | 128/897 |
| 7,850,456 B2 | * | 12/2010 | Chosack et al. | 434/272 |
| 7,963,770 B2 | * | 6/2011 | Kukora et al. | 434/262 |
| 7,967,679 B2 | * | 6/2011 | Ombrellaro et al. | 463/30 |
| 8,262,668 B2 | * | 9/2012 | Biegun | 606/99 |
| 2007/0243512 A1 | | 10/2007 | King | |
| 2009/0246747 A1 | | 10/2009 | Buckman | |
| 2009/0298034 A1 | | 12/2009 | Parry et al. | |
| 2011/0060555 A1 | * | 3/2011 | Koehler et al. | 703/1 |

* cited by examiner

*Primary Examiner* — Kurt Fernstrom
*Assistant Examiner* — Dolores Collins
(74) *Attorney, Agent, or Firm* — Gary L. Eastman, Esq.

(57) ABSTRACT

A wearable device for simulating wounds and injuries received during a trauma event includes a raiment and vest for covering the torso of a person. The raiment has an outer surface with a color and a texture comparable to human skin. Mounted on the outer surface is at least one wound simulator formed with an orifice that is in fluid communication with a fluid reservoir. Thus, the person can selectively expel a blood-like fluid from the reservoir, and through the wound simulator orifice, to simulate a trauma event. The vest includes an artificial rib cage and prosthetic internal organs juxtaposed with at least one wound simulator to simulate internal effects of a trauma event.

19 Claims, 5 Drawing Sheets

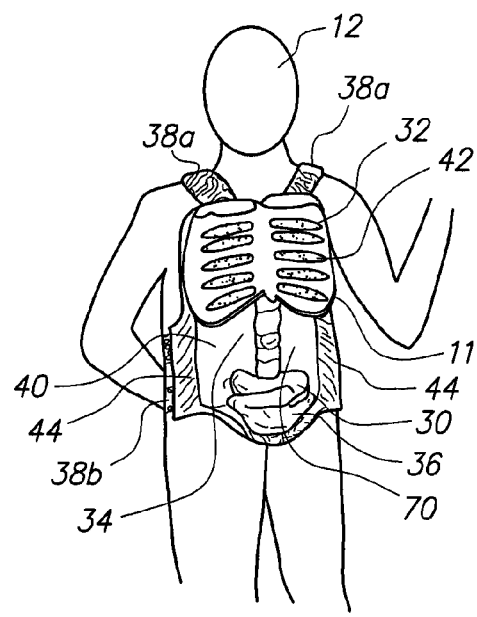
FIG. 2A
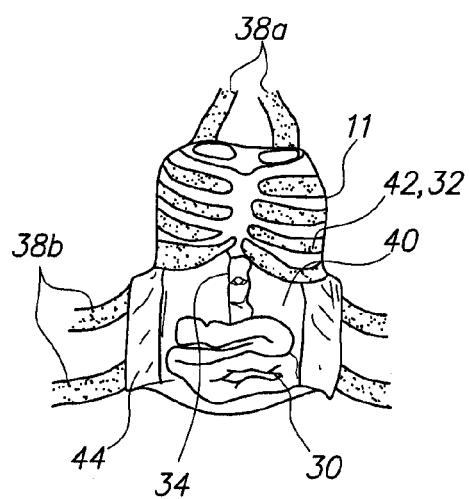 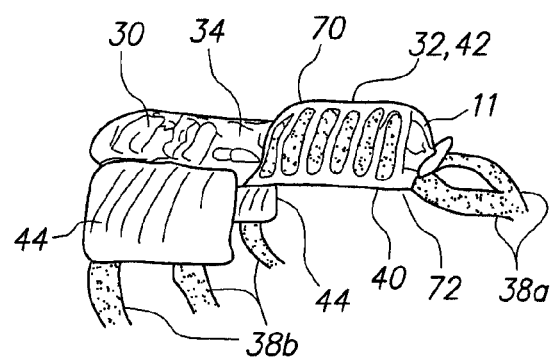
FIG. 2B     FIG. 2C

WEARABLE PARTIAL TASK SURGICAL SIMULATOR

FIELD OF THE INVENTION

The present invention pertains generally to devices and methods for use in simulating the injurious effects of a traumatic event on a person. More particularly, the present invention pertains to devices and methods for simulating the wounds and injuries that a person may receive during such an event. The present invention is particularly, but not exclusively, useful as a training aid for providing realistic-looking medical effects to first responders, in a dynamic presentation, when practicing first aid on a person who has experienced trauma.

BACKGROUND OF THE INVENTION

As is well known, and widely accepted, partial task simulators and training aids can be very effective for teaching individuals how to perform a wide variety of different tasks. More specifically, they can be extremely helpful for teaching an individual how to perform certain medical procedures. In this context, and of particular importance for the present invention, are those medical procedures that are required for response to a life-threatening, emergency situation. The import here is two-fold. Firstly, the partial task simulator should effectively augment the educational background that is necessary to assess an emergency situation. Secondly, it should serve as a tool with which a person can learn how to respond to an emergency situation by properly performing essential life-saving tasks. The efficacy of any partial task simulator or training aid, however, is dependent on the realism it provides and its ability to simulate or mimic an environment where the task is to be actually performed.

With the above in mind, a catastrophic event presents a situation wherein the proper training of emergency medical personnel can be invaluable. Regardless whether the event is the result of an accident, a natural disaster or some form of combat, the consequence of a first response to the event may make the difference between life and death. In such instances, the ability of medical personnel to rapidly and reliably attend to wounds and injuries is of crucial importance. Practice on partial task simulators such as medical mannequins, while valuable as teaching aids, are limited by the mannequin's immobility, weight, expense and minimal interaction with the medical personnel.

In light of the above, it is an object of the present invention to provide a device for realistically and dynamically simulating the wounds and injuries on a person (e.g., role player, actor) that can be received during a traumatic event. Another object of the present invention is to provide a device that effectively functions as a training aid to teach a person how to treat the wounds and injuries that can be received by a person during a traumatic event. Another object of the present invention is to provide a device that effectively functions as a training aid that allows verbal and gesticular interaction between a live human wearing the device and a first responder who is treating the person wearing the device. Still another object of the present invention is to provide a training aid for teaching how to treat wounds and injuries that is easy to use, is simple to manufacture and is comparatively cost effective.

SUMMARY OF THE INVENTION

In accordance with the present invention, a partial task surgical simulator (training aid device) is provided for simulating the wounds and injuries on a role player, actor or model that could be received by a person during a trauma event. Specifically, the device includes a raiment fitting over strapped vests that are dimensioned to cover the torso of a person and therefore be worn by a person in a simulation. Further, the raiment can extend over the person's shoulders and upper arms, as well as over his/her groin area and upper thighs. Structurally, the raiment is made primarily of silicone and nylon fiber, and it is formed as a layer having an inner surface and an outer surface, with the outer surface having a color and a texture that is comparable to human skin. The vest is designed to fit under the raiment and on the torso of a body. Structurally, the vest is made primarily of silicone, nylon fiber, plastic and rubber materials, and it is formed as a shield portion covering the front and side of the torso held in place by straps. The vest provides a protective layer between the raiment and the model or actor. The vest is further designed to provide a detail of the internal structure of a human body, such as the rib cage and internal organs. The vest forms a cavity generally under and below the rib cage in which such prosthetic internal organs can be placed. The importance of the invention is that the simulator presents first responders with realistic-looking, dynamic medical effects that can simulate and mimic a plurality of different wounds and injuries.

As part of the presentation for simulating a trauma event, the device of the present invention comprises a wound simulator that can be selectively attached to the outer surface of the raiment. The wound simulator can then simulate either surface or penetrating wounds and injuries. For example, the wound simulator can be used to simulate surface injuries such as burns, scrapes, abrasions, or the effects of chemical, biological or nuclear agents, or the result of internal injuries from punctures and other injuries. Additionally, the wound simulator can be used to simulate penetrating injuries such as high and low velocity missile wounds caused by gunshot, shrapnel, and blunt/sharp object penetration.

In order to provide added realism for the simulation of penetrating wounds, the raiment is formed with at least one orifice on its outer surface. Further, the raiment includes at least one fluid reservoir that is formed into the layer of the raiment, between its inner and outer surfaces. Specifically, the reservoir is provided for holding a blood-like fluid, and it is connected in fluid communication with the orifice. Thus, the person who is wearing the raiment can selectively expel the blood-like fluid from the reservoir and through the orifice, merely by squeezing the reservoir, to simulate bleeding. Depending on the particularly desired presentation, a wound simulator may be juxtaposed with the orifice to simulate bleeding from the wound.

In addition to the outward appearances of traumatic wounds and injuries mentioned above, the present invention also employs prosthetics to mimic certain internal organs and anatomical structures that may be affected by the trauma event. These prostheses are made of composite materials such as open or closed cell polyurethane foam of various densities, elasticity, and deformation characteristics to simulate internal organs. Specifically, these prostheses can be used to mimic torso injuries (e.g., abdominal, upper torso; as well as other injuries, such as thorax wounds/injuries).

For the simulation of penetrating wounds, the present invention includes access through the raiment, such as through an orifice, to internal organs within the cavity of the vest. Further, the orifice, wound simulators, reservoirs and internal organs are positioned and juxtaposed to simulate various injury scenarios, which may be selectively done. For example, the organs may include a predetermined length of flexible tubing that is comparable in appearance and texture to intestines. When used, this pseudo intestine is positioned between the vest and the inner surface of the raiment. Further, a portion of the pseudo intestine can be juxtaposed with at least one orifice in the raiment for use in simulating the penetrating abdominal wound within the torso cavity. Similar simulations can be used for various upper torso injuries (e.g., lungs, heart, kidneys, stomach, etc.).

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 2A is a perspective view of a vest in accordance with the present invention mounted on a human body;

FIG. 2B is a front view of a vest in accordance with the present invention;

FIG. 2C is a side view of a vest in accordance with the present invention;

DESCRIPTION OF THE PREFERRED EMBODIMENTS

Figure 1:
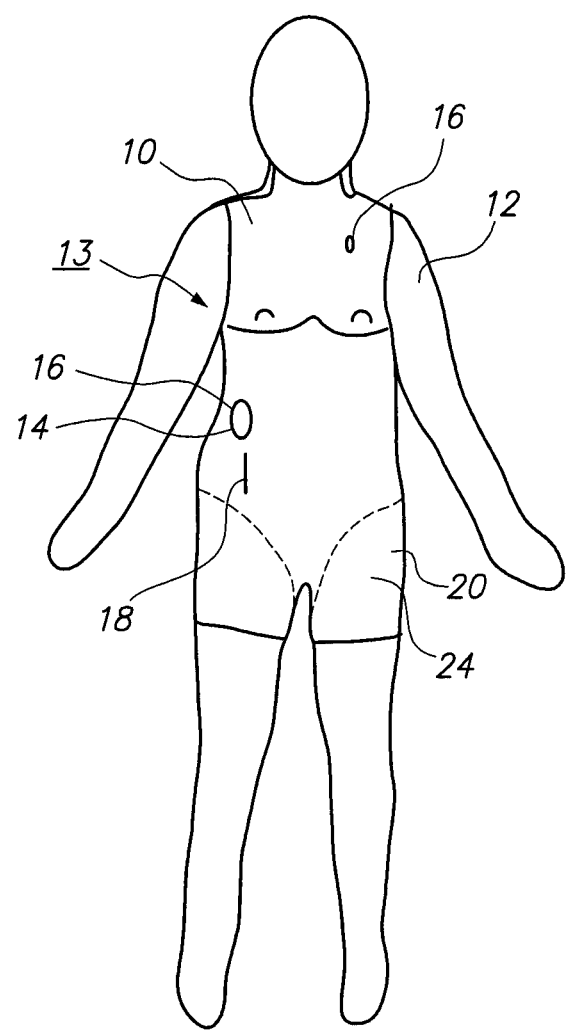
FIG. 1 is a front view of a raiment in accordance with the present invention mounted on a human body.

Referring initially to FIG. 1, a simulator in accordance with the present invention is shown and designated 13. As shown, a raiment in accordance with the present invention is also shown and designated 10. As shown, the raiment 10 is dimensioned and fitted to cover a person 12 (e.g., person, role player, actor, model). As such, the raiment 10 is a base member of the simulator 13. More specifically, the raiment 10 is intended to be wearable by a person. Accordingly, it is intended to cover the torso of a person 12, and to extend over the shoulders, upper arms, groin area and upper thighs of the person 12. For purposes of this disclosure, the person 12 is shown in FIG. 1 to present these anatomical features. FIG. 1 also indicates that a wound simulator 14 can be used with the raiment 10, and that the raiment 10 can be formed with an orifice 16 from which a blood-like fluid 18 can be expelled. For example, the wound simulator 14 can be used to simulate surface injuries such as burns, scrapes, abrasions, radiation, or the result of internal injuries from punctures and other injuries. Additionally, the wound simulator 14 can be used to simulate penetrating injuries to the internal cavity of the human torso. As further shown in FIG. 1 (and FIGS. 3A and 3B), blood-like fluid 18 may be expelled in various ways (e.g., patches, spots, drops, drips, puddles, ooze spots).

As further shown in FIG. 1, the raiment 10 is made of a layer 20 having an outer surface 24. Preferably, the layer 20 is made of a silicon material that contains nylon fibers. However, other materials may also be used, such as carbon fibers, other composite materials, latex and other rubber materials.

In any event, the layer 20 must be sufficiently flexible to allow it to be worn by a person 12 as the person 12 moves to mimic the motions of a severely injured victim of a traumatic event. For this purpose, the outer surface 24 of the raiment 10 is preferably colored and textured to simulate human skin. In alternative embodiments, portions of inner layer 22 may be resin coated to protect the person 12 from being cut, such as by a surgical instrument in simulating trauma events and response to trauma events.

Referring to FIG. 2A, a vest in accordance with the present invention is also shown and designated 11. As shown, vest 11 is dimensioned to fit on the torso of a person 12 underneath the raiment 10. Vest 11 is fitted onto a person 12 by portions 40, 42 and 44 and straps 38a and 38b. More specifically, vest 11 has a first portion 40 covering at least part of the chest of a person 12. Portion 40 is akin to a shield. Portion 40 may be used to protect the person 12 in the course of simulating trauma events and responses to trauma events. Accordingly, it may be made of rigid material, such as polyurethane resin or resin coated.

Vest 11 has a second portion 42 attached to the first portion 40 and forms a cavity 34 in the general area between the first and second portions 40, 42. Vest 11 also has third and fourth side portions 44 attached to the first portion 40 and covering at least part of the sides of the torso of a person 12. Portions 44 may be integrated into portion 40, such as being one continuous portion. Portions 44, 42 and 40 may also be integrated together into one piece constituting the major component of vest 11, other than straps 38. Portions 40, 42 and 44 may also be attached by various conventional mechanical means such as adhesives, fasteners, welding, melding and other joiners. Portions 40, 42 and 44 are preferably constructed of composite or plastic material, but other and additional materials may also be used, such as silicon material that contains nylon fibers, carbon fibers, other composite materials and latex and other rubber materials.

As shown in FIGS. 2A and 2B, portions 40 and 44 have front and back sides 70, 72. In general, the back sides 72 face towards person 12 and the front sides 70 face away from person 12. As also indicated in FIGS. 2A, 2B and 2C, front side 70 of portions 40 and 42 may be colored or textured to mimic or otherwise resemble the internal cavity of the torso of a body.

Also, as shown in FIGS. 2A, 2B and 2C, portion 42 is preferably made as an artificial rib cage 32. As such, portion 42, as rib cage 32, is a prosthetic resembling a human rib cage. Portion 42, including as rib cage 32, is positioned against the inner surface 22 of the raiment 10 (see also FIGS. 3A, 3B, 4) to simulate a skeletal structure. As also shown, at least one prosthetic internal organ 36 (e.g., intestine 30) is positioned within the cavity 34 of the vest 11.

Figure 4:
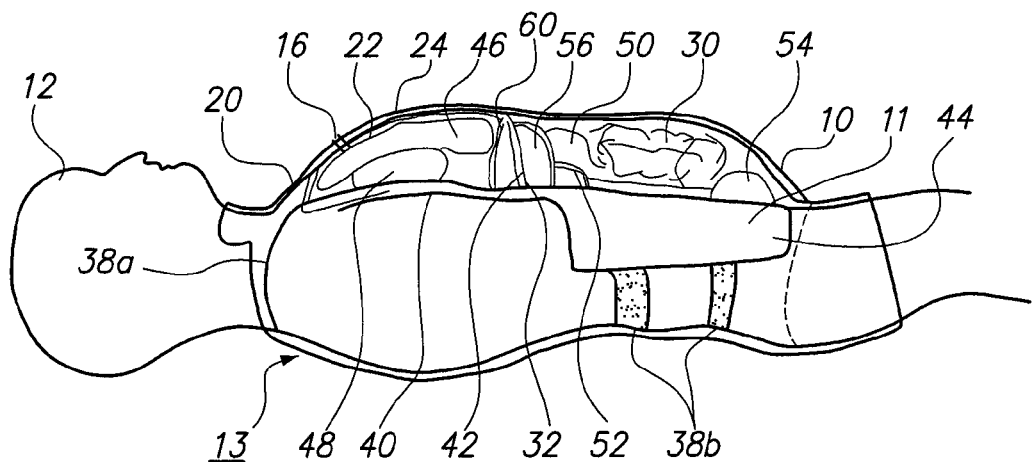
FIG. 4 is side view of a simulator in accordance with the present invention mounted on a human body with a cut away view of the vest underneath the raiment.
Figure 5:
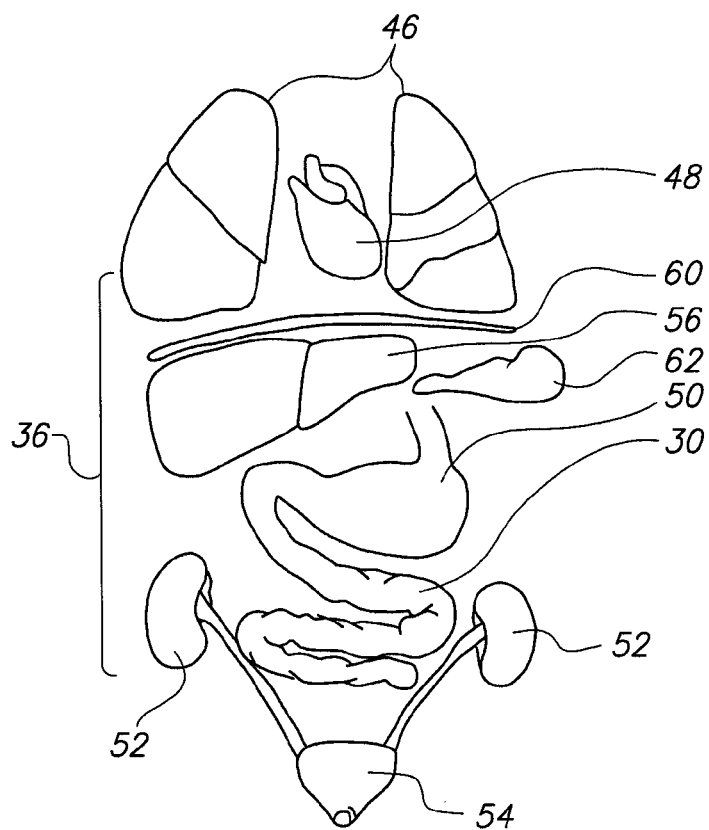
FIG. 5 is an exploded view of prosthetic internal organs of the present invention.

The one or more prosthetic internal organs 36 (e.g., intestine 30 as shown in FIGS. 2A, 2B, and 2C; lungs 46, heart 48, stomach 50, kidneys 52, bladder 54, liver 56, diaphragm 60 and spleen 62 as shown in FIGS. 4 and 5) are attached to vest 11 by fittings, adhesives, fasteners, welding, melding and other joiners. Alternatively, one or more prosthetic internal organ 36 may be positioned within cavity 34 of vest 11 without attachment to vest 11.

As further shown in FIGS. 2A, 2B and 2C, the vest 11 is intended to cover at least a part of the front of the torso of a person 12 and to fit over the person's shoulders or around the person's neck by straps 38a and around the torso of the person by straps 38b. Straps 38a are secured to portion 40 of vest 11 and may be secured together or to other straps by various well known means (e.g., buckles, ties, Velcro, etc.). Straps 38b are secured to portion 40 or 44 of vest 11 and may be secured together or to straps 38a in the same fashion.

Figure 3A:
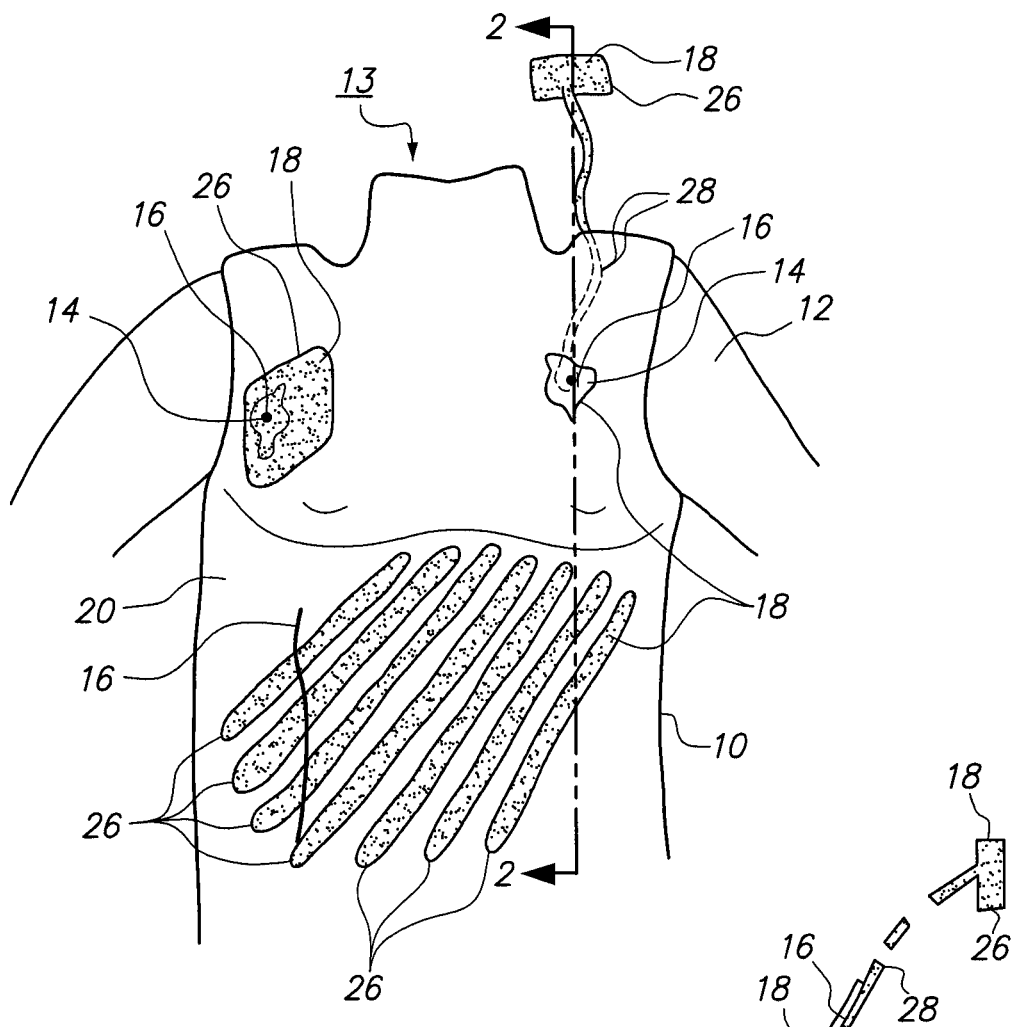
FIG. 3A is a perspective view of the simulator of the present invention with cut away views to show internal features of the raiment.
Figure 3B:
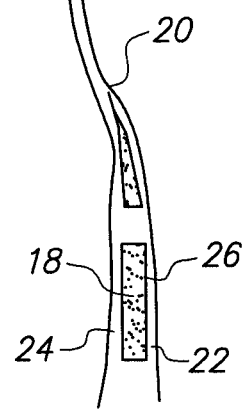
FIG. 3B is a cross sectional view seen along line 2-2 in FIG. 3A.

The structural aspects of the raiment 10 will be more fully appreciated by referencing FIGS. 3A and 3B. There it will be seen that layer 20 of the raiment 10 has inner surface 22 in addition to an outer surface 24. FIGS. 3A and 3B show that the layer 20 of raiment 10 can be formed with one or more reservoirs 26 for holding the blood-like fluid 18 therein. As shown, reservoirs 26 may be embedded in raiment 10 between inner and outer surfaces 22 and 24 or covered by raiment 10. Reservoirs 26 may constitute any shape, including generally rectangular or circular pockets (over the right chest area of person 12 in FIG. 3A), strand like pockets (over the stomach area of person 12 in FIG. 3A) or separate containers (over the left shoulder of person 12 in FIG. 3A). Reservoirs 26 may be attached to raiment 10 by fluid channels 28. Fluid channels 28 preferably constitute flexible tubing mounted under the outer surface 24 of the raiment 10 and may extend and join to reservoirs 26 proximate to or distant from the raiment 10. Tubing for fluid channels 28 may be of predetermined length. Fluid channels 28 constituting such tubing may be positioned against the inner surface 22 of the raiment 10 with a portion thereof juxtaposed with at least one orifice 16. For example, a fluid channel 28 is provided to connect the reservoir 26 in fluid communication with the orifice 16 for use in simulating a penetrating internal wound. Importantly, the reservoir 26 is positioned so it can be squeezed by a hand of a limb of the person 12 who is wearing the raiment 10. Reservoir 26 may be also positioned to be manipulated by the person 12 wearing the raiment 10 to expel blood like fluid 18 in alternative ways, such as by applying pressure with a limb to the reservoir 26 or by changing the position of person 12. This will then cause a portion of blood-like fluid 18 to be expelled from the reservoir 26 and through the orifice 16 to simulate bleeding. As shown, wound simulator 14 may be further aligned with orifice 16 to further simulate the injury, wound or other trauma event.

As shown further in FIG. 3B, reservoir 26 may be filled with blood like fluid 18 and may further be refillable via conventional means, such as filling fluid 18 into reservoir 26 via the same opening for connection of reservoir 26 to channel 28. Or reservoir 26 may be a separate container or pocket with a separate opening for filling reservoir 26 with fluid 18. As such, reservoir 26 may be used to expel fluid 18 for multiple uses. Reservoirs 26 are also preferably replaceable for multiple uses of simulator 13 to simulate multiple trauma events.

Referring back to FIG. 1, it will be appreciated that wound simulator 14 can be juxtaposed with the orifice 16 to simulate a bleeding abrasion. On the other hand, the orifice 16 can be presented as a puncture wound, substantially as shown in FIG. 1, without a surrounding wound simulator 14. By further example, orifice 16 can also present an opening to the cavity 34 of vest 11 to display and access one or more prosthetic internal human organs 36 during simulation of a penetrating wound to the human body. As intended for the present invention, the orifice 16 and the wound simulator 14 can be located anywhere on the raiment 10, as desired, to simulate a plurality of different wound/injury presentations. Also, the wound simulator 14 can be used alone to simulate gas or liquid agent injuries.

In addition to the superficial wound/injury presentations disclosed above, the present invention also envisions presentations for internal injuries. Specifically, with reference to FIGS. 4 and 5, it will be seen that the present invention includes various prostheses for use in simulating wounds/injuries that might be received in a trauma event. These prostheses include: a prosthetic intestine 30, a prosthetic rib cage 32, prosthetic lungs 46, a prosthetic heart 48, a prosthetic stomach 50, prosthetic kidneys 52, a prosthetic bladder 54, prosthetic liver 56, prosthetic diaphragm 60 and a prosthetic spleen 62. In detail, for example, the prosthetic intestine 30 is a length of flexible hosing that is made to resemble a real intestine. Such flexible hosing may be used as fluid channel 28 or reservoir 26 to selectively expel blood like fluid 18. Alternatively, fluid channel 28 and/reservoir 26 may be selectively attached to the hosing of intestine 30 to simulate bleeding from the intestine 30 during simulation of a trauma event. Similar arrangements can be made with respect to any of the organs 36.

Preferably, the prosthetic internal organs 36 (30, 46, 48, 50, 52, 54, 56, 60, 62) and rib cage 32 are made from composite, plastic or rubber materials. These prostheses of internal organs 36 (30, 46, 48, 50, 52, 54, 56, 60, 62) are most preferably made of composite materials such as open or closed cell polyurethane foam of various densities, elasticity, and deformation characteristics to simulate internal organs. Other and additional materials may also be used, such as silicon material that contains nylon fibers, carbon fibers, other composite materials and latex and other rubber materials. The prosthetic rib cage 32 is preferably made from rigid material, such as rigid polyurethane resin material. In use, both the prosthetic rib cage 32 and any desired combination of prosthetic internal organs (30, 46, 48, 50, 52, 54, 56, 60, 62) are positioned between the body of the person 12 (actor) who is wearing the raiment 10, and the inner surface 22 of the raiment 10 within the cavity 34 of the vest 11.

As shown in FIG. 4, and also in connection with FIGS. 3A and 3B, internal prosthetic organ(s) 36 may be positioned proximate to at least one orifice 16 and at least one fluid reservoir 26 for simulation of a penetrating wound to the human torso. In use, the raiment 10 of the present invention can be used with any combination of superficial wounds/injuries disclosed above. Specifically, there may be a plurality of reservoirs 26, with a corresponding number of orifices 16. Likewise, a plurality of wound simulators 14 can be used.

The prosthetics of organs 36 (i.e. intestine 30, rib cage 32, lungs 46, heart 48, stomach 50, kidneys 52, bladder 54, liver 56, diaphragm 60, spleen 62 (see FIG. 5) and thorax described below may, or may not, be used, as desired. The prosthetic organs 36 may be combined within the cavity 34 in various combinations to simulate wounds and injuries. FIG. 4 shows a preferred embodiment including a large group or package of organs 36. Further, the prosthetic organs 36 may be combined into such packages and formed to represent certain wounds and injuries. For example, a package may be assembled to simulate injuries to the lungs 46 and heart 48 and another package may be assembled to simulate injuries to the stomach 50 and liver 56. The prosthetic organs 36 and packages of prosthetic organs are interchangeable so that various injury scenarios can be simulated. The wound simulators 14, orifices 16, channels 28 and reservoirs 26 are similarly interchangeable and positionable in alternative arrangements so that various injury scenarios can be simulated. And, as explained above, the positions of the wound simulators 14, orifices 16, channels 28, reservoirs 26 and organs 36 may be selectively juxtaposed to simulate various wounds and injuries. Collectively, the component elements of the present invention are intended to be used to simulate or mimic the various wounds/injuries that are likely to be received by a person involved in a traumatic event.

Figure 6:
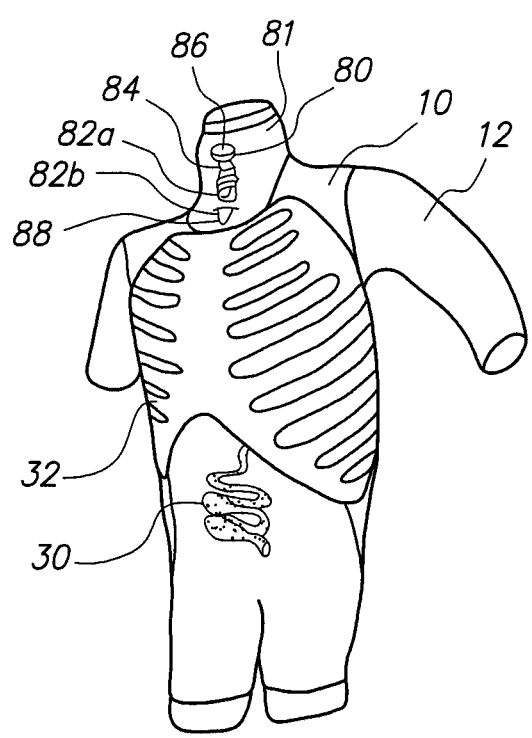
FIG. 6 is a perspective view of the prosthetic thorax of the invention.

As shown in FIG. 6, in alternative embodiments, penetrating injuries to the thorax can also be simulated by mounting a prosthetic thorax 80 under or on the raiment 10 in the area of the neck of the person 12. In detail, the prosthetic thorax 80 is held on a bib 81 by retaining straps 82a and 82b, and the bib 81 is mounted or fitted around the neck of person 12. For example, bib 81 can have straps, ties, Velcro or other fasteners to secure bib 81 at the back of the neck of person 12. The prosthetic thorax 80 and bib 81 can fit underneath or over raiment 10. Structurally, the prosthetic thorax 80 includes an elongated hollow tube-like member 84 that has an open end 86 and a closed end 88. For use, the tube 84 is presented on the bib 81, and the bib 81 is positioned on the throat of the person 12 with the open end 86 positioned for receipt of a cricothyroid tube (not shown). Thus, the prosthetic thorax 34 can be used for simulating an invasive surgical placement of a cricothyroidotomy. Operationally, the tube-like member 40 is held on the raiment 10 to mimic a thorax, and to present its open end 86 for access thereto with a chest tube during a simulation of a penetrating wound to the thorax. These prostheses can be made of plastic, rubber or composite materials, such as open or closed cell polyurethane foam of various densities, elasticity, and deformation characteristics to simulate internal organs.

Use of the wearable partial task surgical simulator 13 as a teaching aid is accomplished by using the simulator 13 on a person 12 who portrays an injured person in a trauma event. The simulator 13 dynamically simulates the wounds and injuries the person 12 received during the simulated traumatic event. The simulator 13 is set up to simulate a trauma event among various possible scenarios. Simulator 13 allows verbal and gesticular interaction between person 12 wearing the simulator 13 and a first responder (e.g. trainee, trainer, other participant) who is treating the person 12 wearing the simulator 13.

Accordingly, in using the partial task surgical simulator 13 as a teaching aid, the raiment 10 is provided with at least one wound simulator 14 related to the simulated trauma event and at least one fluid reservoir 26 for holding a blood-like fluid 18 and is in fluid communication with at least one orifice 16. The vest 11 is provided on person 12 underneath the raiment 10 and provides simulation of the internal skeletal structure (e.g., rib cage 32) and internal organs (e.g., prosthetic organs 36) of the person 12 simulating injury in the trauma event. Person 12 selectively expels the blood-like fluid 18 from the reservoir 26 and through the orifice 16 to simulate the trauma event. Simulator 13 is used to mimic a penetrating wound by positioning a predetermined length of flexible tubing (e.g., intestine 30 or fluid channel 28) against the inner surface 22 of the raiment 10 with a portion thereof juxtaposed with the orifice 16 of at least one superficial wound. At least one fluid reservoir 26 is attached to a length of flexible tubing (e.g., fluid channel 28) attached to the raiment 10 and reservoir 26 is manipulated to expel blood-like fluid 18. A first responder selectively accesses at least one prosthetic internal human organ 36 in the cavity 34 through at least one orifice 16 of the raiment 10 during simulation of a penetrating wound to the human body. The prosthetic human internal organs 36 are selected from among multiple combinations of prosthetic human internal organs 36 and used in the cavity 34 of the vest 11 to simulate from among various internal organ structure injuries involved in a selected trauma event.

While the particular Wearable Partial Task Surgical Simulator as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A wearable device for simulating a trauma event which comprises a raiment dimensioned to cover the torso of a person, wherein the raiment is formed as a layer having an inner surface and an outer surface, and wherein the outer surface has a color and a texture comparable to human skin, and further wherein the raiment has at least one fluid reservoir for holding a blood-like fluid therein and is formed with at least one orifice on the outer surface thereof in fluid communication with the reservoir for selectively expelling the blood-like fluid from the reservoir and through the orifice to simulate the trauma event; and the device further comprising a vest dimensioned to fit on the torso of a person underneath the raiment, wherein the vest has a first portion covering at least part of the chest of a person, a second portion attached to the first portion and forming a cavity generally between the first and second portions, and third and fourth side portions attached to the first portion and covering at least part of the sides of the torso of a person.

2. A device as recited in claim 1 further comprising a wound simulator attached to the outer surface of the raiment to mimic an injury received during the trauma event wherein the wound simulator is juxtaposed with the orifice.

3. A device as recited in claim 1 wherein the raiment extends from the torso over the shoulders and upper arms of the person, and further wherein the raiment extends from the torso over the groin and upper thighs of the person.

4. A device as recited in claim 1 further comprising a predetermined length of flexible tubing mounted under the outer surface of the raiment, wherein the tubing is positioned against the inner surface of the raiment with a portion thereof juxtaposed with at least one orifice for use in simulating a penetrating internal wound.

5. A device as recited in claim 1 wherein the second portion of the vest is an artificial rib cage positioned against the inner surface of the raiment to simulate a skeletal structure and at least one prosthetic internal organ is positioned within the cavity of the vest proximate to at least one orifice and at least one fluid reservoir for simulation of a penetrating wound to the human torso.

6. A device as recited in claim 5 further comprising multiple prosthetic internal organs positioned within the cavity of the vest as a package.

7. A device as recited in claim 5 further comprising multiple packages of prosthetic internal organs that are each positionable within the cavity of the vest to represent various simulations of trauma events.

8. A device as recited in claim 1 wherein at least one fluid reservoir is formed in the layer of the raiment, between the inner surface and the outer surface, and is positioned to be manipulated by the person to expel the blood-like fluid therefrom.

9. A device as recited in claim 1 wherein at least one fluid reservoir is attached to a length of flexible tubing attached to the raiment, and the at least one fluid reservoir is positioned to be manipulated by the person to expel the blood-like fluid therefrom to the tubing and through at least one orifice.

10. A device as recited in claim 9 wherein at least one fluid reservoir is refillable with blood-like fluid for multiple uses by the person to expel the blood-like fluid therefrom.

11. A device for simulating wounds and injuries received by a person during a trauma event which comprises:
    a base member formed with at least one reservoir for holding a blood-like fluid therein, and wherein at least one reservoir is positioned on the base member to be manipulated by the person wearing the device to selectively expel the blood-like fluid therefrom;

at least one wound simulator mounted on the base member and formed with an orifice in fluid communication with the reservoir;

a penetrating wound simulator mounted on the base member; and a vest proximate to the base member with an access thereto for a prosthetic internal human organ positioned between the vest and base member during simulation of a penetrating wound to the human body, wherein the base member is a raiment dimensioned to cover the torso of a person and to extend therefrom over the shoulders and upper arms and over the groin and upper thighs of the person, and further wherein the raiment is formed as a layer having an inner surface and an outer surface, and the outer surface has a color and a texture comparable to human skin, and wherein the vest is dimensioned to fit on the torso of a person underneath the raiment, and wherein the vest has a first portion covering at least part of the chest of a person and part of the side of the torso of a person, and a second portion attached to the first portion and forming a cavity generally between the first and second portions.

12. A device as recited in claim 11 further comprising a predetermined length of flexible tubing, wherein the tubing is positioned against the inner surface of the raiment with a portion thereof juxtaposed with at least one orifice for use in simulating a penetrating torso wound.

13. A device as recited in claim 11 further comprising at least one fluid reservoir attached to a length of flexible tubing attached to the raiment, and the at least one fluid reservoir positioned to be manipulated by the person to expel the blood-like fluid therefrom.

14. A device as recited in claim 11 wherein the second portion of the vest is an artificial rib cage positioned against the inner surface of the raiment to simulate a skeletal structure and at least one prosthetic internal human organ is removable from the device and replaceable to the device with another prosthetic internal human organ to select from among and simulate more than one type of wound involved in the trauma event.

15. A method for simulating a trauma event which comprises the steps of:

providing a raiment formed as a layer having an inner surface and an outer surface, wherein the outer surface has a color and a texture comparable to human skin, and further wherein the raiment has at least one wound simulator formed with an orifice on the outer surface thereof and has at least one fluid reservoir for holding a blood-like fluid therein, the reservoir being in fluid communication with the orifice of the wound simulator;

providing a vest proximate to the raiment, wherein the vest is dimensioned to fit on the torso of a person underneath the raiment and has a first portion covering at least part of the chest of a person and part of the side of the torso of a person, and a second portion attached to the first portion and forming a cavity generally between the first and second portions, and wherein the second portion of the vest is an artificial rib cage to simulate a skeletal structure and wherein at least one prosthetic internal human organ is positioned in the cavity; and selectively expelling the blood-like fluid from the reservoir and through the orifice to simulate the trauma event.

16. A method as recited in claim 15 further comprising the step of mimicking a penetrating wound by positioning a predetermined length of flexible tubing against the inner surface of the raiment with a portion hereof juxtaposed with the orifice of at least one superficial wound.

17. A method as recited in claim 15 further comprising the step of providing at least one fluid reservoir attached to a length of flexible tubing attached to the raiment, and manipulating the at least one fluid reservoir to expel the blood-like fluid therefrom.

18. A method as recited in claim 15 further comprising the step of selectively accessing at least one prosthetic internal human organ in the cavity through at least one orifice of the raiment during simulation of a penetrating wound to the human body.

19. A method as recited in claim 15 further comprising the step of selecting one combination of prosthetic human internal organs from among multiple combinations of prosthetic human internal organs and using the selected combination in the cavity of the vest to simulate certain internal organ structure injuries involved in the trauma event.

* * * * *